United States Patent [19]

Valyocsik

[11] Patent Number: 5,670,131
[45] Date of Patent: Sep. 23, 1997

[54] SYNTHETIC POROUS CRYSTALLINE MCM-61, ITS SYNTHESIS AND USE

[75] Inventor: Ernest W. Valyocsik, Yardley, Pa.

[73] Assignee: Mobil Oil Corporation, Fairfax, Va.

[21] Appl. No.: 705,455

[22] Filed: Aug. 29, 1996

Related U.S. Application Data

[60] Provisional application No. 60/004,671, Oct. 2, 1995.

[51] Int. Cl.[6] .................. C01B 39/04; C01B 39/48
[52] U.S. Cl. .................. 423/702; 423/703; 423/718; 502/64; 502/73; 502/74; 502/77
[58] Field of Search .................. 423/701, 702, 423/703, 718; 502/64, 71, 73, 74, 77

[56] References Cited

U.S. PATENT DOCUMENTS

| | | |
|---|---|---|
| 3,950,496 | 4/1976 | Ciric. |
| 4,377,502 | 3/1983 | Klotz. |
| 4,556,549 | 12/1985 | Valyocsik et al. ............ 502/60 |
| 4,837,000 | 6/1989 | Takatsu et al. ............ 502/60 |
| 5,098,686 | 3/1992 | Delprato et al. ............ 423/308 |
| 5,158,757 | 10/1992 | Deloprato et al. ............ 423/709 |
| 5,252,527 | 10/1993 | Zones ............ 502/64 |
| 5,393,511 | 2/1995 | Delprato et al. ............ 423/718 |
| 5,447,709 | 9/1995 | Anglerot et al. ............ 423/702 |

*Primary Examiner*—Mark L. Bell
*Assistant Examiner*—David Sample
*Attorney, Agent, or Firm*—Malcolm D. Keen; Peter W. Roberts

[57] ABSTRACT

This invention relates to a new synthetic porous crystalline material, designated MCM-61, a method for its preparation and use thereof as a sorbent or in catalytic conversion of organic or inorganic compounds. The new crystalline material exhibits a distinctive X-ray diffraction pattern.

9 Claims, 1 Drawing Sheet

SYNTHETIC POROUS CRYSTALLINE MCM-61, ITS SYNTHESIS AND USE

This application is a continuation of provisional application Ser. No. 60/004,671 filed Oct. 2, 1995.

BACKGROUND OF THE INVENTION

1. Field of the Invention

This invention relates to a novel composition of synthetic porous crystalline material, to a method for its preparation and to its use as a sorbent or in catalytic conversion of organic or inorganic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicate of varying alumina and metal content.

SUMMARY OF THE INVENTION

The present invention is directed to a novel composition of a porous crystalline material, named MCM-61, a method for its preparation, its use as a selective sorbent, and in the conversion of organic or inorganic compounds contacted with an active form thereof. The calcined form of the porous crystalline material of this invention possesses acid activity and sorption capacity. MCM-61 is reproducibly synthesized by the present method in high purity.

DESCRIPTION OF SPECIFIC EMBODIMENTS

Figure 1:
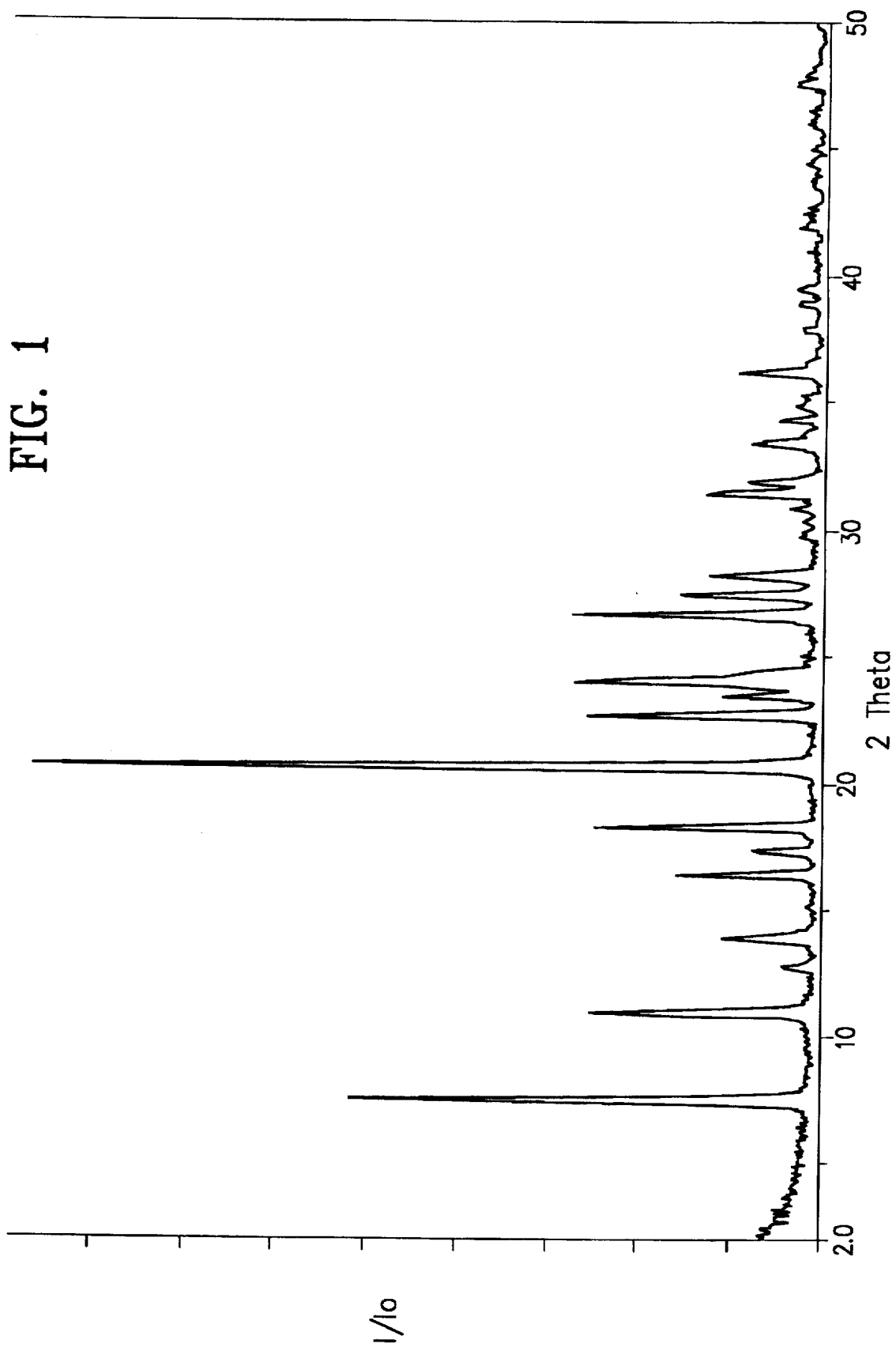
FIG. 1 shows the X-ray diffraction pattern of the calcined product of Example 3, hereinafter presented.

The crystalline material of this invention has a composition involving the molar relationship:

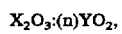

$$X_2O_3:(n)YO_2,$$

wherein X is a trivalent element, such as aluminum, boron, iron, indium, and/or gallium, preferably aluminum; Y is a tetravalent element such as silicon, tin, and/or germanium, preferably silicon; and n is from about 15 to about 200, usually from about 30 to about 90. In the as-synthesized form, the material has a formula, on an anhydrous basis and in terms of moles of oxides per n moles of $YO_2$, as follows:

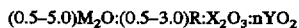

$$(0.5-5.0)M_2O:(0.5-3.0)R:X_2O_3:nYO_2$$

wherein M comprises potassium, and R is an organic moiety. The M and R components are associated with the material as a result of their presence during crystallization, and are easily removed by post-crystallization methods hereinafter more particularly described.

The crystalline material of the invention is thermally stable and in the calcined form exhibits significant hydrocarbon sorption capacity. To the extent desired, the original potassium and any alkali or alkaline earth cations of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

The crystalline MCM-61 material of the invention appears to be a single crystalline phase. It can be prepared in essentially pure form with little or no detectable impurity crystal phases and has an X-ray diffraction pattern in the calcined form which is distinguished from the patterns of other known as-synthesized or thermally treated crystalline materials by the lines listed in Table I below:

TABLE I

| Interplanar d-Spacing (Å) | Relative Intensity, I/Io × 100 |
|---|---|
| 11.69 ± 0.50 | m-s |
| 8.02 ± 0.15 | vw-w |
| 6.94 ± 0.13 | vw |
| 6.34 ± 0.20 | vw-w |
| 5.40 ± 0.12 | vw-w |
| 5.11 ± 0.10 | vw |
| 4.85 ± 0.10 | vw-w |
| 4.31 ± 0.12 | vs |
| 3.92 ± 0.15 | vw-m |
| 3.79 ± 0.08 | vw-w |
| 3.69 ± 0.08 | vw-m |
| 3.37 ± 0.08 | vw |
| 3.26 ± 0.10 | vw-w |
| 3.16 ± 0.06 | vw-w |
| 2.850 ± 0.06 | vw-w |
| 2.806 ± 0.05 | vw-w |
| 2.680 ± 0.05 | vw-w |
| 2.617 ± 0.05 | vw |
| 2.491 ± 0.08 | vw-w |
| 2.380 ± 0.06 | vw |
| 2.318 ± 0.06 | vw |
| 2.276 ± 0.08 | vw |
| 2.042 ± 0.05 | wv |
| 1.913 ± 0.06 | vw |
| 1.895 ± 0.06 | vw |

X-ray diffraction data were collected with a Scintag diffraction system, equipped with a germanium solid state detector, using copper K-alpha radiation. The diffraction data were recorded by step-scanning at 0.05 degrees of two-theta, where theta is the Bragg angle, and a counting time of 1 second for each step. The interplanar spacings, d's, were calculated in Angstrom units (A), and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history.

When used as a catalyst, the crystalline material of the invention may be subjected to treatment to remove part or all of any organic constituent. The crystalline material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The crystalline MCM-61 material can be transformed by thermal treatment. This thermal treatment is generally performed by heating at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the MCM-61 in a vacuum, but a longer time is required to obtain a sufficient amount of dehydration.

The present crystalline material can be prepared from a reaction mixture containing sources of potassium (M) cations, an oxide of trivalent element X, e.g., aluminum and/or boron, an oxide of tetravalent element Y, e.g., silicon, directing agent (R), and water, said reaction mixture having a composition, in terms of mole ratios of oxides, within the following ranges:

| Reactants | Useful | Preferred |
|---|---|---|
| $YO_2/X_2O_3$ | 15 to 200 | 30 to 90 |
| $H_2O/YO_2$ | 5 to 200 | 20 to 100 |
| $OH^-/YO_2$ | 0 to 3.0 | 0.10 to 0.50 |
| $M/YO_2$ | 0 to 3.0 | 0.10 to 2.0 |
| $R/YO_2$ | 0.02 to 1.0 | 0.10 to 0.50 |

In the present synthesis method, the preferred source of $YO_2$ comprises predominately solid $YO_2$, for example at least about 30 wt. % solid $YO_2$. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) is preferred for MCM-61 formation from the above mixture. Preferably, therefore, the $YO_2$, e.g., silica, source contains at least about 30 wt. % solid $YO_2$, e.g., silica, and more preferably at least about 40 wt. % solid $YO_2$, e.g., silica.

The organic directing agent R for use herein is a crown ether selected from the group consisting of 15-Crown-5, 18-Crown-6 and combinations thereof. These compounds may be represented as follows:

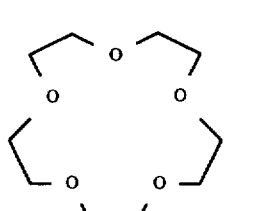
15-Crown-5

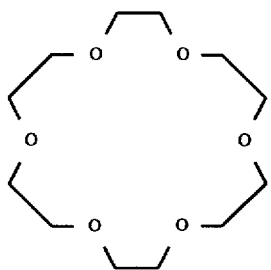
18-Crown-6

Crystallization of the present crystalline material can be carried out at either static or stirred conditions in a suitable reactor vessel, such as for example, polypropylene jars or teflon lined or stainless steel autoclaves. The total useful range of temperatures for crystallization is from about 80° C. to about 250° C. for a time sufficient for crystallization to occur at the temperature used, e.g., from about 12 hours to about 100 days. Thereafter, the crystals are separated from the liquid and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used to catalyze a wide variety of chemical conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity.

Specific examples include:

(1) toluene disproportionation, with reaction conditions including a temperature of from about 200° C. to about 760° C., a pressure of from about atmospheric to about 60 atmospheres, a weight hourly space velocity (WHSV) of from about 0.1 $hr^{-1}$ to about 20 $hr^{-1}$, and a hydrogen/hydrocarbon mole ratio of from 0 (no added hydrogen) to about 50, to provide disproportionation product, including p-xylene;

(2) transalkylation of aromatics, in gas or liquid phase, with reaction conditions including a temperature of from about 100° C. to about 500° C., a pressure of from about 1 to about 200 atmospheres, and a WHSV of from 1 $hr^{-1}$ to about 10,000 $hr^{-1}$;

(3) reaction of paraffins with aromatics to form alkylaromatics and light gases with reaction conditions including a temperature of from about 260° C. to about 375° C., a pressure of from about 0 to about 1000 psig, a WHSV of from about 0.5 $hr^{-1}$ to about 10 $hr^{-1}$, and a hydrogen/hydrocarbon mole ratio of from 0 (no added hydrogen) to about 10;

(4) paraffin isomerization to provide branched paraffins with reaction conditions including a temperature of from about 200° C. to about 315° C., a pressure of from about 100 to 1000 psig, a WHSV of from about 0.5 $hr^{-1}$ to about 10 $hr^{-1}$, and a hydrogen/hydrocarbon mole ratio of from about 0.5 to about 10; and (5) alkylation of aromatics with olefins with reaction conditions including a temperature of from about 200° C. to about 500° C., a pressure of from about 0 to 500 psig, a total WHSV of from about 0.5 $hr^{-1}$ to about 50 $hr^{-1}$, a hydrogen/hydrocarbon mole ratio of from 0 (no added hydrogen) to about 10, and an aromatic/olefin mole ratio of from 1 to about 50.

The crystalline material of this invention can also be used as a sorbent or as a sorbent for separation of substances from mixtures thereof. For example, at least one component may be separated from a mixture of components in the vapor or liquid phase having differential sorption characteristics with respect to the MCM-61 sorbent by contacting the mixture containing the components with the MCM-61 sorbent to selectively sorb from the mixture and onto the sorbent at least one component of the mixture, so as to effect a selective separation of the at least one sorbed component from the remaining at least one unsorbed component of the mixture. In the process for selective sorption the mixture may comprise water and at least one hydrocarbon component, at least one hydrocarbon component of the mixture being selectively sorbed on the MCM-61 sorbent in preference to the water in the mixture.

The sorption process may involve a mixture comprising at least two hydrocarbon components, at least one of which is selectively sorbed on the MCM-61 sorbent in preference to at least one other hydrocarbon component of the mixture.

The sorption separation of this invention may involve a mixture comprising an alcohol and at least one hydrocarbon component, at least one hydrocarbon component of the mixture being selectively sorbed on the MCM-61 sorbent in preference to the alcohol in the mixture.

In the case of many catalysts, it is desired to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for cyclohexane and water, they were Equilibrium Adsorption values determined as follows.

A weighed sample of the calcined adsorbent was contacted with the desired pure adsorbate vapor in an adsorption chamber, evacuated to less than 1 mm and contacted with 40 Torr of cyclohexane vapor or 12 Torr of water, pressures less than the vapor-liquid equilibrium pressure of the respective adsorbate at room temperature. The pressure was kept constant (within about ±0.5 mm) by addition of adsorbate vapor controlled by manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in mg/g of calcined adsorbent.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395.

EXAMPLES 1–11

Experiments were conducted for synthesis of crystalline product material. In these experiments, $Al_2(SO_4)_3 \cdot 18H_2O$ and KOH or NaOH pellets were dissolved in deionized water. The 15-Crown-5 (15-C-5) or 18-Crown-6 (18-C-6) crown ether was then dissolved in the solution. Colloidal silica sol (30 wt. % $SiO_2$) was then mixed into the solution.

The mixture was stirred for 2 minutes to produce a uniform, fluid hydrogel, having, respectively, the compositions shown in Table II where R is the crown ether directing agent. The $H_2O/SiO_2$ molar ratio for each reaction mixture composition was maintained at 40/1. Each had an $OH^-/SiO_2$ molar ratio of 0.30.

The hydrogel of each experiment was then transferred to a 300 ml stainless steel autoclave equipped with a stirrer. The autoclave was capped and sealed; and 400 psig of inert gas was introduced into the autoclave. Stirring and heating were started immediately. Crystallizations were carried out at 170° C. with stirring for 7 days.

Crystalline products were recovered, filtered, washed with deionized water, and dried on a filter funnel in an air stream under an infrared lamp. The dried crystalline powder products were then submitted for X-ray diffraction and chemical analysis.

TABLE II

Mixture Composition (Mole ratios)

| Example | R | $SiO_2/Al_2O_3$ | $K^+/SiO_2$ | $Na^+/SiO_2$ | $R/SiO_2$ | Product |
|---|---|---|---|---|---|---|
| 1 | 15-C-5 | 30 | 0.57 | — | 0.40 | MCM-61 |
| 2 | 18-C-6 | 30 | — | 0.33 | 0.32 | Mordenite |
| 3 | 18-C-6 | 60 | 0.43 | — | 0.30 | MCM-61 |
| 4 | 18-C-6 | 60 | 0.43 | — | 0.32 | MCM-61 |
| 5 | 18-C-6 | 60 | 0.43 | — | 0.50 | MCM-61 |
| 6 | 18-C-6 | 60 | 0.43 | — | 0.30 | MCM-61 |
| 7 | 15-C-5 | 60 | 0.43 | — | 0.40 | MCM-61 |
| 8 | 18-C-6 | 60 | — | 0.33 | 0.35 | Mordenite + α–quartz |
| 9 | 18-C-6 | 90 | — | 0.32 | 0.35 | ZSM-5 + α–quartz |
| 10 | 18-C-6 | 180 | 0.34 | — | 0.35 | α–cristobalite |
| 11 | 18-C-6 | ∞$^+$ | 0.30 | — | 0.35 | α–quartz |

$^+$Source of aluminum not added to reaction mixture.

The X-ray diffraction data for calcined (500° C. in air for 15 hours) product of Example 3 is presented in Table III. The X-ray diffraction pattern generated by the calcined product of Example 3 is presented in FIG. 1.

TABLE III

| Interplanar d-Spacing (A) | I/I$_o$ |
|---|---|
| 11.70 | 50 |
| 8.03 | 25 |
| 6.92 | 3 |
| 6.35 | 8 |
| 5.85 | <1 |
| 5.39 | 14 |
| 5.11 | 6 |
| 4.84 | 23 |
| 4.30 | 100 |
| 3.92 | 25 |
| 3.79 | 10 |
| 3.70 | 26 |
| 3.65 | 5 |
| 3.37 | 7 |
| 3.34 | 27* |
| 3.25 | 16 |
| 3.16 | 11 |
| 2.98 | 1 |
| 2.945 | 1 |
| 2.898 | 2 |
| 2.845 | 12 |

TABLE III-continued

| Interplanar d-Spacing (A) | I/I₀ |
|---|---|
| 2.805 | 6 |
| 2.684 | 6 |
| 2.652 | 1 |
| 2.616 | 4 |
| 2.576 | 2 |
| 2.550 | 1 |
| 2.484 | 9 |
| 2.458 | 1* |
| 2.376 | 1 |
| 2.315 | 2 |
| 2.281 | 2 |
| 1.193 | 2 |
| 1.900 | 1 |

*quartz impurity

Chemical analysis results for the as-synthesized products of Examples 1, 3, 4, 5, 6, and 7 are presented in Table IV.

TABLE IV

Moles per Mole $Al_2O_3$

| | Moles H/ | | | | Compostion (1) | | |
|---|---|---|---|---|---|---|---|
| Example | Mole C | R: | $K_2O$: | $SiO_2$ | Al/ 100 Td | $K^+$/ 100 Td | R/ 100 Td |
| 1 | 2.70 | 0.72 | 1.31 | 24.2 | 7.5 | 10.0 | 2.7 |
| 3 | 2.39 | 0.83 | 0.73 | 25.1 | 7.4 | 5.4 | 3.1 |
| 4 | 2.63 | 2.01 | 1.97 | 39.8 | 4.8 | 9.4 | 4.8 |
| 5 | 2.59 | 1.23 | 1.61 | 42.6 | 4.5 | 7.2 | 2.7 |
| 6 | 2.72 | 1.53 | 1.95 | 49.6 | 3.9 | 7.6 | 3.0 |
| 7 | 2.44 | 2.28 | 4.34 | 57.8 | 3.3 | 14.0 | 3.8 |

(1) Calculated on the basis of 100($SiO_2$ + $AlO_2$) tetrahedra

There appears to be no clear correlation for the potassium content over the range of product $SiO/Al_2O_3$ mole ratios, but there does appear to be an average of about 3 crown ethers per 100 tetrahedra in the MCM-61 framework, indicating templating activity for the crown ethers.

EXAMPLES 12-13

MCM-61 products of Examples 4 and 5 were weighed into quartz boats, then placed into a Heviduty® tube furnace and sealed with nitrogen gas flowing through the furnace tube. The heating of the furnace was begun at 2° C./minute from room temperature to 538° C. When the furnace reached the maximum temperature, the flowing gas was switched to air, and the calcination of the zeolite was continued for 15 hours before termination.

The air calcined samples were ammonium exchanged with 1M $NH_4NO_3$ at 80° C. for 6 hours. After ammonium exchange, the zeolites were filtered, washed with deionized water, and dried in an air stream on the filter funnel under an infrared heat lamp.

The calcination procedure was repeated on the ammonium-exchanged materials in the tube furnace in the same manner as described above, except this time the samples were held at 538° C. for 8 hours to convert them to HMCM-61. Examples 12 and 13 products were HMCM-61 materials from the products of Examples 4 and 5, respectively.

EXAMPLE 14

A sample of the HMCM-61 product of Example 13 was tested for acid catalytic activity in the Alpha Test and found to have an Alpha Value of 10.

What is claimed is:

1. A synthetic porous crystalline material characterized by an X-ray diffraction pattern including values substantially as set forth in Table I and having a composition comprising the molar relationship $$X_2O_3:(n)YO_2,$$

wherein n is from about 15 to about 200, X is a trivalent element, and Y is a tetravalent element.

2. The crystalline material of claim 1 having a composition, on an anhydrous basis and in terms of moles of oxides per n moles of $YO_2$, expressed by the formula:

$$(0.5-5.0)M_2O:(0.5-3.0)R:X_2O_3:nYO_2$$

wherein M comprises potassium and R is an organic moiety.

3. The crystalline material of claim 2 wherein R is a crown ether selected from the group consisting of 15-Crown-5, 18-Crown-6, and mixtures thereof.

4. The crystalline material of claim 2 having original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB and VIII of the Periodic Table of the Elements.

5. The crystalline material of claim 1 wherein X is selected from the group consisting of boron, iron, indium, gallium, aluminum, and a combination thereof; and Y is selected from the group consisting of silicon, tin, germanium, and a combination thereof.

6. A composition comprising the crystalline material of claim 1 and a matrix.

7. The composition of claim 6 wherein said matrix comprises alumina, silica, zirconia, titania, magnesia, beryllia or a combination thereof.

8. A method for synthesizing crystalline material exhibiting a characteristic X-ray diffraction pattern including d-spacing values shown in Table I which comprises (i) preparing a mixture capable of forming said material, said mixture comprising sources of potassium (M), an oxide of trivalent element (X), an oxide of tetravalent element (Y), water, and directing agent (R) comprising crown ether selected from the group consisting of 15-Crown-5, 18-Crown-6 and mixtures thereof, and having a composition, in terms of mole ratios, within the following ranges:

| $YO_2/X_2O_3$ | 15 to 200 |
|---|---|
| $H_2O/YO_2$ | 5 to 200 |
| $OH^-/YO_2$ | 0 to 3.0 |
| $M/YO_2$ | 0.10 to 3.0 |
| $R/YO_2$ | 0.02 to 1.0 |

(ii) maintaining said mixture under sufficient conditions including a temperature of from about 80° C. to about 250° C. until crystals of said material are formed; and (iii) recovering said crystalline material from step (ii).

9. The method of claim 8 further comprising replacing ions of the crystalline material recovered in step (iii), at least in part, by ion exchange with an ion or a mixture of ions selected from the group consisting of hydrogen and hydrogen precursors, rare earth metals, and metals from Groups IIA, IIIA, IVA, IB, IIB, IIIB, IVB, VIB, and VIII of the Periodic Table of Elements.

* * * * *